UNITED STATES PATENT OFFICE.

AUGUSTE J. ROSSI, OF NIAGARA FALLS, NEW YORK, ASSIGNOR TO THE TITANIUM ALLOY MANUFACTURING COMPANY, OF NEW YORK, N. Y., A CORPORATION OF MAINE.

ARTICLE COMPOSED ESSENTIALLY OF TITANIUM AND LEAD AND METHOD OF PRODUCING THE SAME.

1,020,516.     Specification of Letters Patent.     Patented Mar. 19, 1912.

No Drawing.     Application filed January 6, 1911. Serial No. 601,167.

*To all whom it may concern:*

Be it known that I, AUGUSTE J. ROSSI, a citizen of the United States, and a resident of Niagara Falls, in the county of Niagara and State of New York, have invented a certain new and useful Article Composed Essentially of Titanium and Lead and Methods of Producing the Same, of which the following is a specification.

The objects of my present invention comprise the production of a binary alloy of titanium with lead and provision of methods for producing it so simple and reliable in operation, and so economical, as to justify manufacture thereof on industrial scales. I attain these objects as hereinafter described. I have discovered that the said binary alloy of titanium with lead is exceptionally useful for the purpose of purifying lead, in mass, as heretofore produced in the usual processes of manufacture. Lead, while in molten state, absorbs gaseous elements or compounds, which are dissolved in the metal and retained therein as it solidifies during cooling. For instance oxygen from the atmosphere is thus absorbed and, to a great extent, combines chemically with the lead, forming several different oxids thereof, which together with oxygen if any remaining uncombined are found occluded in the mass of the solidified metal. Moreover, throughout said mass are also found, to greater or less extent, other substances or compounds, foreign to lead, resulting from the methods of manufacture, as for instance residual drosses or slags and sometimes sulfids, etc., which, owing to their comparative infusibility and lack of fluidity, are unable to rise out of the molten metal and consequently may, to greater or less extent, remain entangled therein after its solidification. The aforesaid foreign elements and compounds are usually unhomogeneously distributed in uncontrollable locations throughout the mass of the metal, thus producing "blow-holes" or other cavities devoid of lead and often charged with impurities which, when the metal is drawn, as for instance into pipes, result in incorporated layers of foreign substances which proportionately and undesirably impair the metallic continuity of the mass, thus diminishing its efficiency for industrial uses as for instance particularly in pipes and the like, in which it is obviously important that the constituent lead shall be continuous and impervious. I have discovered that the said undesirable impurities can all of them be eliminated from the molten lead mass by addition thereto of metallic titanium in amount proportioned to satisfy the chemical affinities therefor of such undesired elements and their compounds. Titanium however is still I believe unattainable in quantities sufficient for operations on an industrial scale or at all events unattainable except at prohibitory cost. Moreover the peculiar characteristic properties of titanium, as compared with those of lead, cause it to less well and readily alloy properly therewith when added thereto by itself alone than when added thereto in the form of an alloy thereof with lead.

My novel alloy of titanium and lead is therefore of particular importance and utility for the purpose of purifying lead as aforesaid, as well as for other uses. I prefer to produce my said alloy of titanium and lead as follows. I first charge into a graphite crucible, or other container properly adapted, some lead sufficient on being melted to form a small supporting or initiatory bath of that metal. To such lead I add litharge or other oxid of lead and also titanic acid mixed therewith in such proportions as, on reduction, taken together with the lead of the bath, to impart to the resulting alloy the desired respective proportions of the two metals. To the said lead and mixture of oxids I also add such an amount of aluminium (preferably in shots or the like so as to melt more rapidly) as is chemically sufficient to decompose the oxids of lead and of titanium and reduce their respective titanium and lead contents to their metallic states. This mixture is then heated by any convenient means to a point at which the aluminium melts, thereby supplying a bath of molten aluminium to the charge. The additional heat developed by the reduction of the oxid of lead by the aluminium rapidly raises the charge to a temperature required to set up the reduction of the oxid of titanium by the aluminium, which then proceeds until the reduction of all the oxids present is completed. Care should be taken at this point to maintain the temperature of the charge sufficiently high to maintain the fluidity of the nascent alloy, the reactions to which the latter is due being as per the following formula, assuming that litharge $PbO_2$ is the oxid of lead employed:—

$$3PbO_2 + 4Al = 2(Al_2O_3) + 3Pb.$$
$$3TiO_2 + 4Al + Pb = Pb + 2(Al_2O_3) + 3Ti.$$

I prefer to employ the foregoing method largely because of its economy, the cost of the oxid requisite to produce the required amount of lead being considerably less than that of such amount of lead in metallic form, and also because the heat of formation of oxid of lead is so small compared to that of the formation of aluminium oxid as to leave a large surplus of heat immediately applicable to the reduction of the oxid of titanium whereby the reactions are promoted and accomplished at a considerably less expenditure of external heat than required where lead altogether is alone employed in the charge. It will be understood, however, that the said alloy may be produced, though not so advantageously, by substantially the process above referred to by using as the plumbic material, in the process above referred to, metallic lead exclusively, or, on the other hand, by using as such plumbic material oxid of lead exclusively. The molten product on being withdrawn and cooled will be found to be an alloy of titanium and lead, the percentage of the former being proportional to the amounts of titanium oxid and aluminium charged. My said alloy of titanium and lead may also, though not so advantageously, be produced by substituting carbon for aluminium as the reducing agent, in which case it is essential in industrial practice to employ such high temperatures as are derivable from some of the now well known forms of electric furnaces, such for example as illustrated and described in Letters Patent No. 802,941 granted to me October 24, 1905. In this case, oxid of lead, oxid of titanium, and carbon are employed as per the formula:

$$PbO_2 + 2C = 2CO + Pb.$$
$$TiO_2 + 2C = 2CO + Ti.$$

The said ingredients, either with or without some metallic lead as may be preferred, are charged in said furnace and the current turned on. This will result in production of a bath of molten lead, and the current being continued the titanium oxid will be reduced to titanium which mingles or dissolves in said bath of lead to constitute the said alloy. In this instance, like the foregoing, the addition of lead in metallic state, though not absolutely necessary, facilitates the reduction of the titanium oxid by the carbon and it will of course be understood that the alloy may be thus produced by using as the only plumbic material of the charge metallic lead.

The proportions of the ingredients used in the charge will be varied according to the percentage of the respective metals desired in the alloy according to the formulas above given and as experience and test in each case will readily demonstrate to those skilled in the metallurgical art.

What I claim as new and desire to secure by Letters Patent is the following, viz:—

1. As a new article an alloy of titanium with lead.

2. The method of producing an alloy of titanium with lead which comprises incorporating titanic acid into a bath of molten lead in presence of a reducing agent, subjecting the bath to a temperature sufficient to insure reduction of said titanic acid by said agent, and withdrawing and cooling the resulting metallic product.

3. The process of producing an alloy of titanium with lead which comprises incorporating titanic acid into a bath comprising molten lead and molten aluminium, subjecting the bath to a temperature sufficient to insure reduction of said titanic acid by said aluminium and withdrawing and cooling the resulting metallic product.

4. The method of producing an alloy of titanium with lead, which comprises bringing into each other's presence plumbic material, titanic acid and aluminium, and subjecting them to a temperature sufficient to melt the aluminium, and also to produce the said alloy under the conditions stated.

5. The method of producing an alloy of titanium with lead, which comprises bringing into each other's presence oxid of lead, titanic acid, and aluminium, and subjecting them to a temperature sufficient to melt the aluminium, and also to produce the said alloy under the conditions stated.

AUGUSTE J. ROSSI.

Witnesses:
WALTER D. EDMONDS,
GEORGE G. MEASURES.